(12) United States Patent
Zuhlsdorf

(10) Patent No.: US 11,047,438 B2
(45) Date of Patent: Jun. 29, 2021

(54) THERMOCOUPLE PRECISION PRESS

(71) Applicant: Toyota Motor Engineering & Manufacturing North America, Inc., Plano, TX (US)

(72) Inventor: Joseph D. Zuhlsdorf, Anthem, AZ (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 281 days.

(21) Appl. No.: 16/219,796

(22) Filed: Dec. 13, 2018

(65) Prior Publication Data

US 2020/0191220 A1 Jun. 18, 2020

(51) Int. Cl.
*G01B 5/18* (2006.01)
*G01B 3/28* (2006.01)
*F16D 66/00* (2006.01)

(52) U.S. Cl.
CPC ............... *F16D 66/00* (2013.01); *G01B 3/28* (2013.01); *G01B 5/18* (2013.01); *F16D 2066/001* (2013.01)

(58) Field of Classification Search
CPC ............... F16D 66/00; F16D 2066/001; F16D 2250/0084; F16D 65/092; G01B 5/18; G01B 3/28; G01B 3/22
USPC ................. 33/501, 626, 501.14, 501.2, 501.4
See application file for complete search history.

(56) References Cited

U.S. PATENT DOCUMENTS

| | | | |
|---|---|---|---|
| 2,700,905 A | 2/1955 | Urquhart | |
| 2,914,856 A | 12/1959 | Fitzpatrick | |
| 3,037,405 A | 6/1962 | Steyskal | |
| 3,224,104 A | 12/1965 | Platt, II | |
| 3,250,153 A | 5/1966 | Purkey | |
| 3,256,609 A * | 6/1966 | White | G01B 3/22 33/501.2 |
| 3,624,913 A * | 12/1971 | Ciampolini | G01B 3/22 33/701 |
| 3,776,647 A | 12/1973 | Hart | |
| 3,863,351 A * | 2/1975 | Kalen | G01B 5/22 33/501 |
| 4,577,412 A * | 3/1986 | McKinney | G01B 5/06 33/502 |
| 4,651,430 A * | 3/1987 | Vasku | G01B 5/08 33/501.2 |
| 4,787,794 A | 11/1988 | Guthrie | |

(Continued)

OTHER PUBLICATIONS

*Micro Drill Press Plans* Outpost Enterprises Ltd.; 2 pages; Sep. 11, 2018.

(Continued)

*Primary Examiner* — Yaritza Guadalupe-McCall
(74) *Attorney, Agent, or Firm* — Snell & Wilmer L.L.P.

(57) ABSTRACT

A system, device, and method for adjusting a position of a thermocouple located in a channel within a brake pad, a tip of the thermocouple being aligned with a top surface of the brake pad. The device includes a wheel configured to be turned in a first direction, causing a rod to move downward to contact and push the thermocouple into the brake pad. The device also includes a gauge configured to measure and display a downward distance moved by the rod when the wheel is turned, the downward distance corresponding to a distance between the tip of the thermocouple and the top surface of the brake pad.

18 Claims, 14 Drawing Sheets

(56) References Cited

U.S. PATENT DOCUMENTS

| | | | | |
|---|---|---|---|---|
| 4,821,422 | A * | 4/1989 | Porter | G01B 3/40 33/199 R |
| 4,824,260 | A * | 4/1989 | Novotny | B60T 17/22 188/1.11 L |
| 5,077,909 | A * | 1/1992 | Cranor | G01B 5/0032 33/607 |
| 5,205,046 | A * | 4/1993 | Barnett | G01B 5/285 33/533 |
| 6,408,532 | B1 * | 6/2002 | Keys | G01B 5/02 33/199 R |
| 6,508,009 | B1 * | 1/2003 | Tubis | G01B 5/207 33/549 |
| 6,662,456 | B1 * | 12/2003 | Triplett | G01B 3/22 33/203 |
| 7,000,331 | B2 * | 2/2006 | Kennedy | G01B 3/22 33/626 |
| 7,069,666 | B2 * | 7/2006 | Navarro | B23Q 17/22 33/626 |
| 7,369,916 | B2 | 5/2008 | Etter et al. | |
| 7,395,610 | B2 * | 7/2008 | Suzuki | G01B 3/22 33/832 |
| 9,022,949 | B2 | 5/2015 | Herndon | |
| 9,526,511 | B2 | 12/2016 | Anderson | |
| 9,964,168 | B1 * | 5/2018 | Pennala | F16D 66/024 |
| 2004/0179910 | A1 | 9/2004 | Theising et al. | |
| 2005/0169717 | A1 | 8/2005 | Field | |
| 2013/0232802 | A1 * | 9/2013 | Hayashi | G01B 21/047 33/501 |
| 2020/0191220 | A1 * | 6/2020 | Zuhlsdorf | G01B 5/18 |

OTHER PUBLICATIONS

*Wixey Model WR503 Drill Press Depth Gauge*; 3 pages; Sep. 11, 2018.

*Up Close with the MilesCraft 1318 AccuDrillMate*—Dettorre Furniture; 41 pages; Sep. 11, 2018.

* cited by examiner

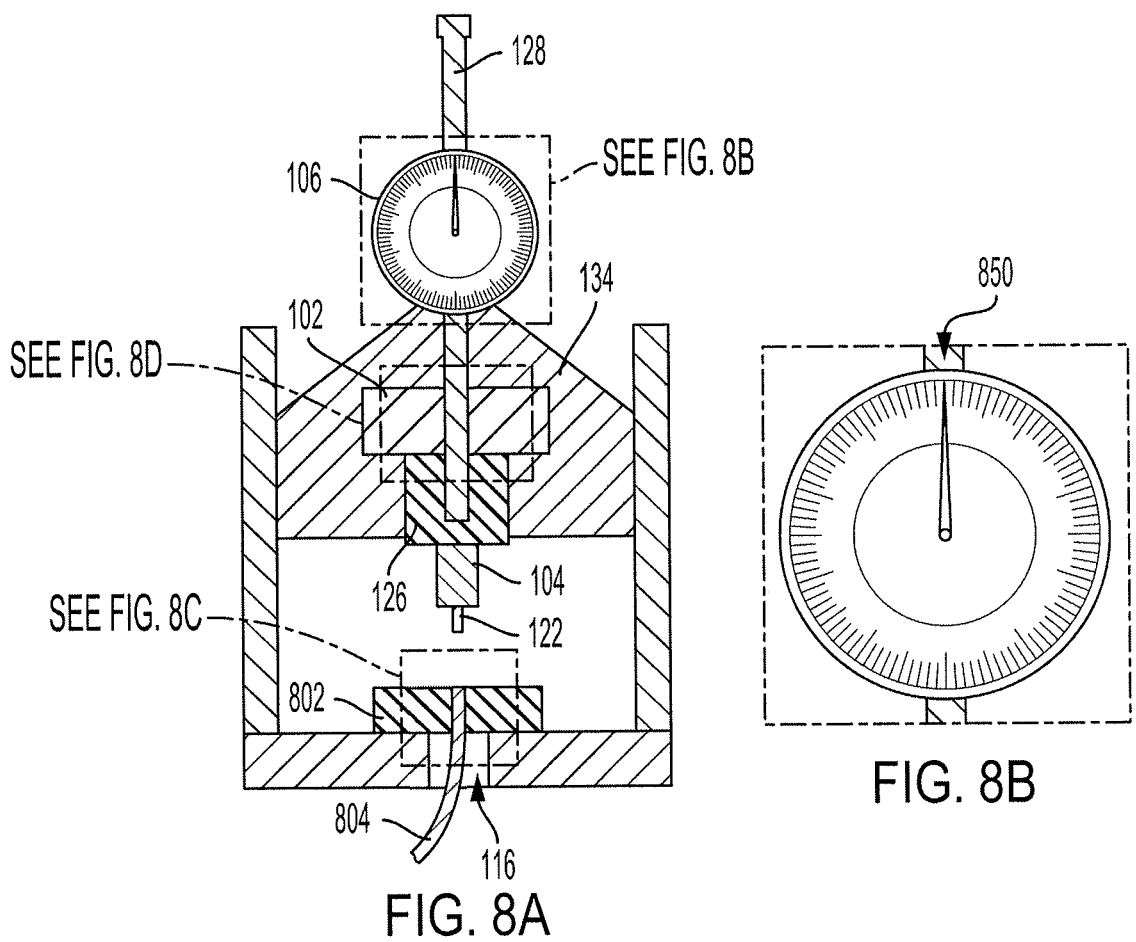
FIG. 8A
FIG. 8B
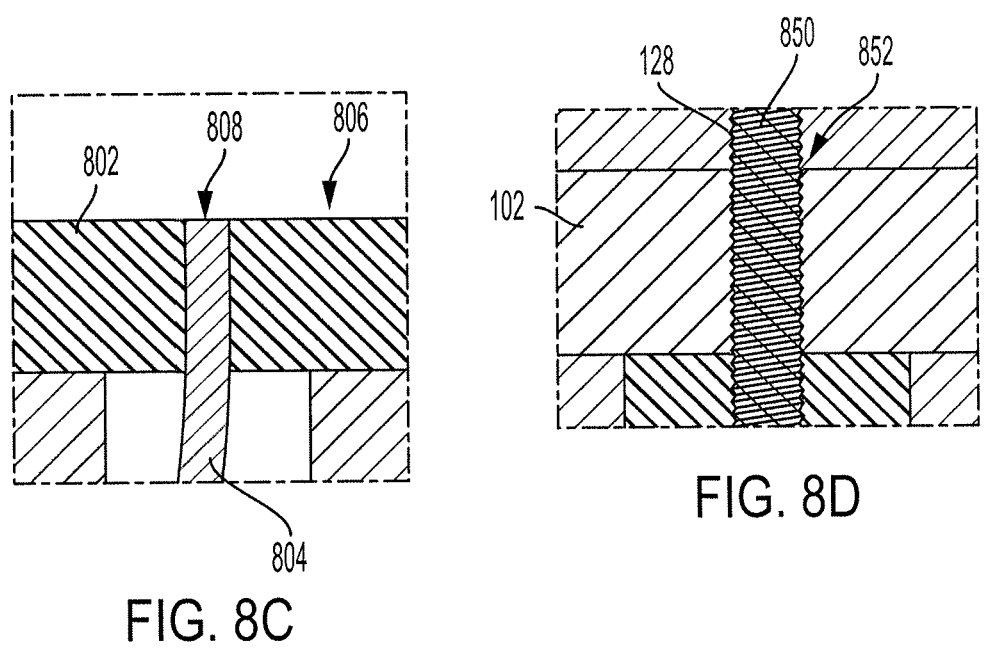
FIG. 8C
FIG. 8D

THERMOCOUPLE PRECISION PRESS

BACKGROUND

1. Field

This specification relates to an apparatus, a device and a method for securely installing a thermocouple to a brake pad on a vehicle.

2. Description of the Related Art

A thermocouple is a device attached to a material or an object to detect temperature data associated with the material or the object. A thermocouple may be positioned anywhere on the material or the object. An object's temperature data may be monitored as the object is subjected to various conditions, to determine the object's tolerance to those conditions. For example, a thermocouple may be connected to a brake pad, and the brake pad may be subjected to various braking tests. The thermocouple may detect the temperature of the brake pad as the various braking tests are administered. The material composition of the brake pad may then be altered based on the detected temperature of the brake pad during the various braking tests. A thermocouple may be inserted into a hole in a brake pad and recessed within the hole. However, there is currently no reliable and precise way to ensure the positioning of the thermocouple inside of the hole in the brake pad. Thus, there is a need for improved positioning of thermocouples inside of brake pads.

SUMMARY

What is described is a device for adjusting a position of a thermocouple located in a channel within a brake pad, a tip of the thermocouple being aligned with a top surface of the brake pad. The device includes a wheel configured to be turned in a first direction, causing a rod to move downward to contact and push the thermocouple into the brake pad. The device also includes a gauge configured to measure and display a downward distance moved by the rod when the wheel is turned, the downward distance corresponding to a distance between the tip of the thermocouple and the top surface of the brake pad.

Also described is a method of adjusting a position of a thermocouple within a brake pad, the thermocouple having a tip aligned with a top surface of the brake pad. The method includes moving a rod towards the tip of the thermocouple until the rod contacts the tip of the thermocouple. The method also includes resetting a gauge configured to measure a vertical movement of the rod. The method also includes further moving the rod such that the rod pushes the tip of the thermocouple into the brake pad. The method also includes determining whether a desired depth has been met based on a reading of the gauge. The method also includes ceasing movement of the rod.

Also described is a device for adjusting a position of an apparatus located in a channel within an object, a first end of the apparatus being aligned with a top surface of the object. The device includes a wheel configured to be turned in a first direction, causing a rod to move downward to contact and push the apparatus into the object. The device also includes a gauge configured to measure and display a downward distance moved by the rod when the wheel is turned, the downward distance corresponding to a distance between the first end of the apparatus and the top surface of the object.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 8A-8D illustrate a front cross-sectional view of the thermocouple precision press in a first position, according to various embodiments of the invention.

DETAILED DESCRIPTION

Disclosed herein are systems and methods for positioning a thermocouple within a brake pad or other object. A thermocouple may be placed within a hole of a brake pad in order to detect temperature data of the brake pad. However, the end of the thermocouple may be recessed within the brake pad in order to accurately detect the temperature of the brake pad. If the thermocouple is exposed, it may detect the temperature of the rotor instead of the temperature of the brake pad. In addition, if the thermocouple makes contact with the rotor, flashing may occur, potentially damaging the thermocouple. The recessing of the thermocouple into the brake pad may be accomplished using thermocouple precision press 100 of FIG. 1.

Figure 1:
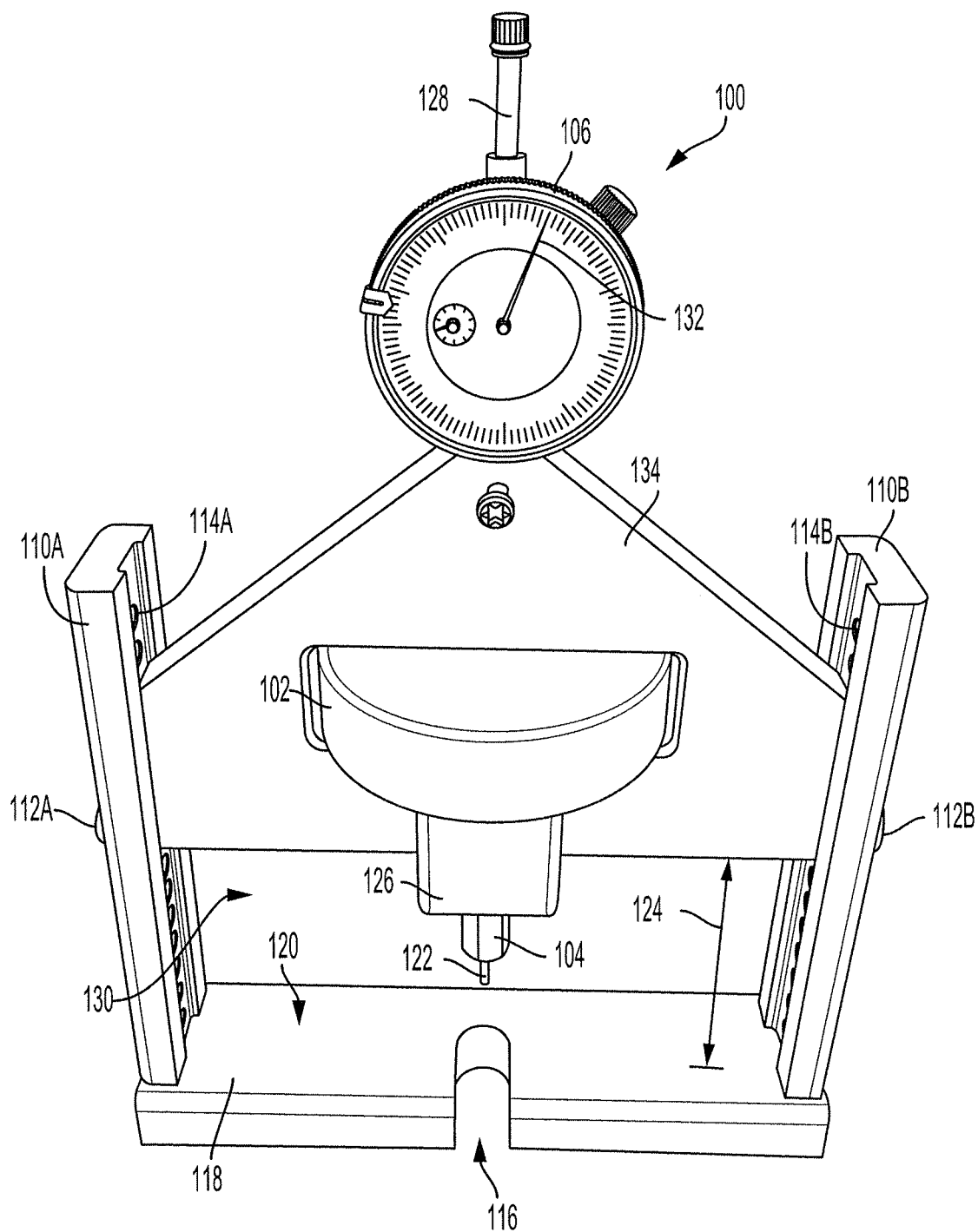
FIG. 1 illustrates the thermocouple precision press, according to various embodiments of the invention.

Referring to FIG. 1, the thermocouple precision press 100 includes a wheel 102 located within a body 134. The wheel 102 may be turned, which moves a block 126 vertically relative to the wheel 102 and the body 134. The distance the block 126 moves vertically may be measured by a gauge 106 having an arm 132. A rod 122 and a rod base 104 may be coupled to the block 126. Thus, when the wheel 102 is turned, the rod 122 moves vertically. In some embodiments, the rod 122 and the rod base 104 are removably coupled to the block 126. In some embodiments, the rod 122 and the rod base 104 are fixedly coupled to the block 126.

The thermocouple precision press 100 includes a shaft 128. The shaft 128 may be threaded and runs through the gauge 106, the body 134, the wheel 102, and is fixedly connected to the block 126. The wheel 102 has teeth configured to engage the threads of the shaft 128 such that a turning of the wheel 102 is translated into a vertical movement of the shaft 128. The shaft 128 being fixedly connected to the block 126 results in the block 126 moving vertically when the wheel 102 is turned. The gauge 106 may have a precision of a thousandth of an inch.

The wheel 102 is shown as being horizontally oriented such that the axis of rotation of the wheel 102 is aligned with the shaft 128. However, in other embodiments, the wheel 102 may be vertically oriented or oriented in any other direction or along any other axis, and one or more gears or other devices may be used to translate the movement of the wheel 102 to vertical movement of the block 126 via the shaft 128.

The body 134 is connected on a first side to a first leg 110A and the body 134 is connected on a second side to a second leg 110B. The first leg 110A and the second leg 110B may be connected to a base plate 118. The first leg 110A may have multiple apertures 114A and the second leg 110B may also have similar apertures 114B, which may receive corresponding pegs on the body 134 to adjust the height of the body 134. That is, the height 124 of the opening 130 is defined by a bottom side of the body 134 and the base plate 118 and may be adjusted by moving the body 134 vertically and fastening the body 134 to the first leg 110A and the second leg 110B. The body 134 may be fastened to the first leg 110A via a first fastener 112A and the body 134 may be fastened to the second leg 110B via a second fastener 112B.

Figure 4:
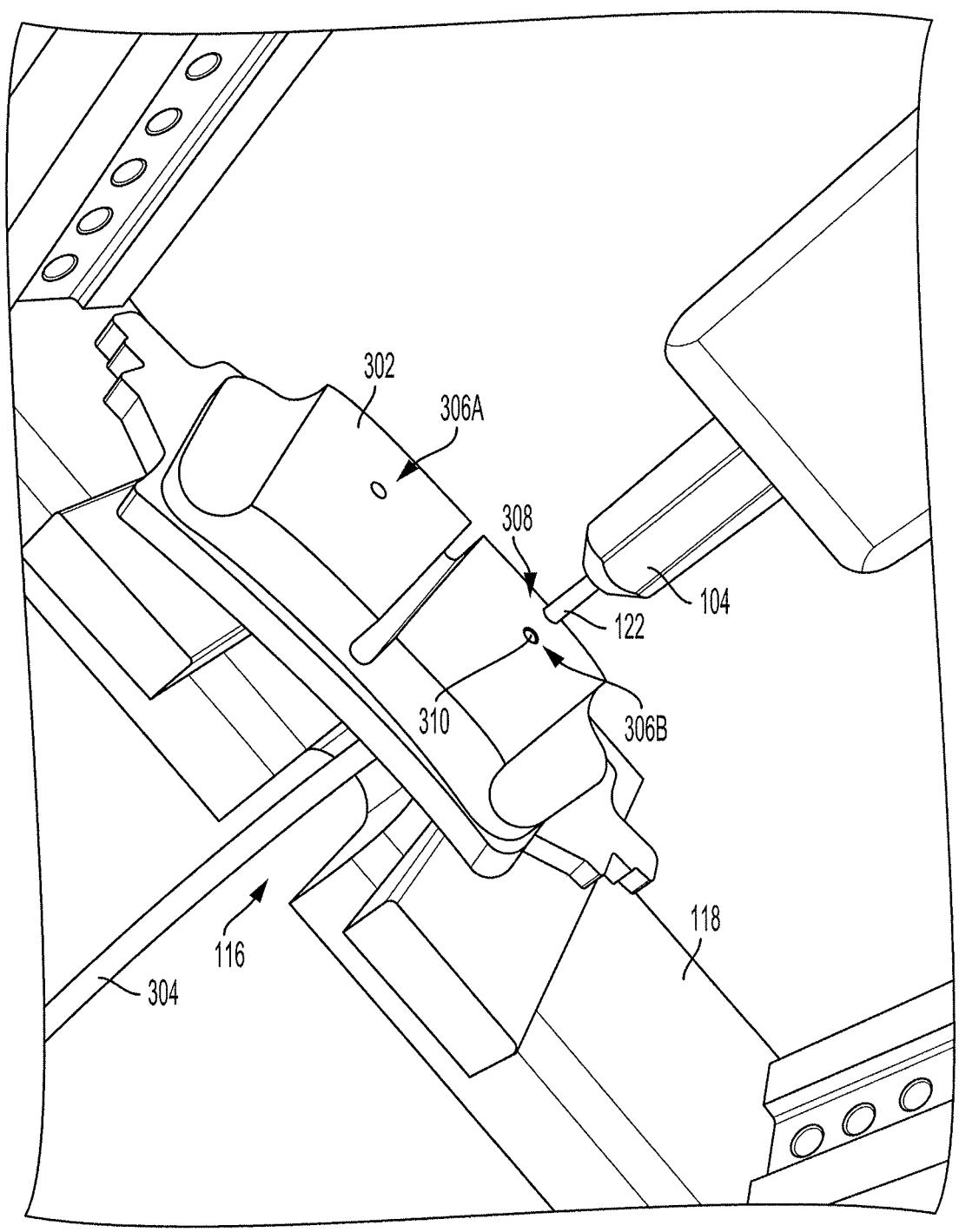
FIG. 4 illustrates the positioning of the brake pad and the thermocouple relative to the thermocouple precision press, according to various embodiments of the invention.
Figure 5A:
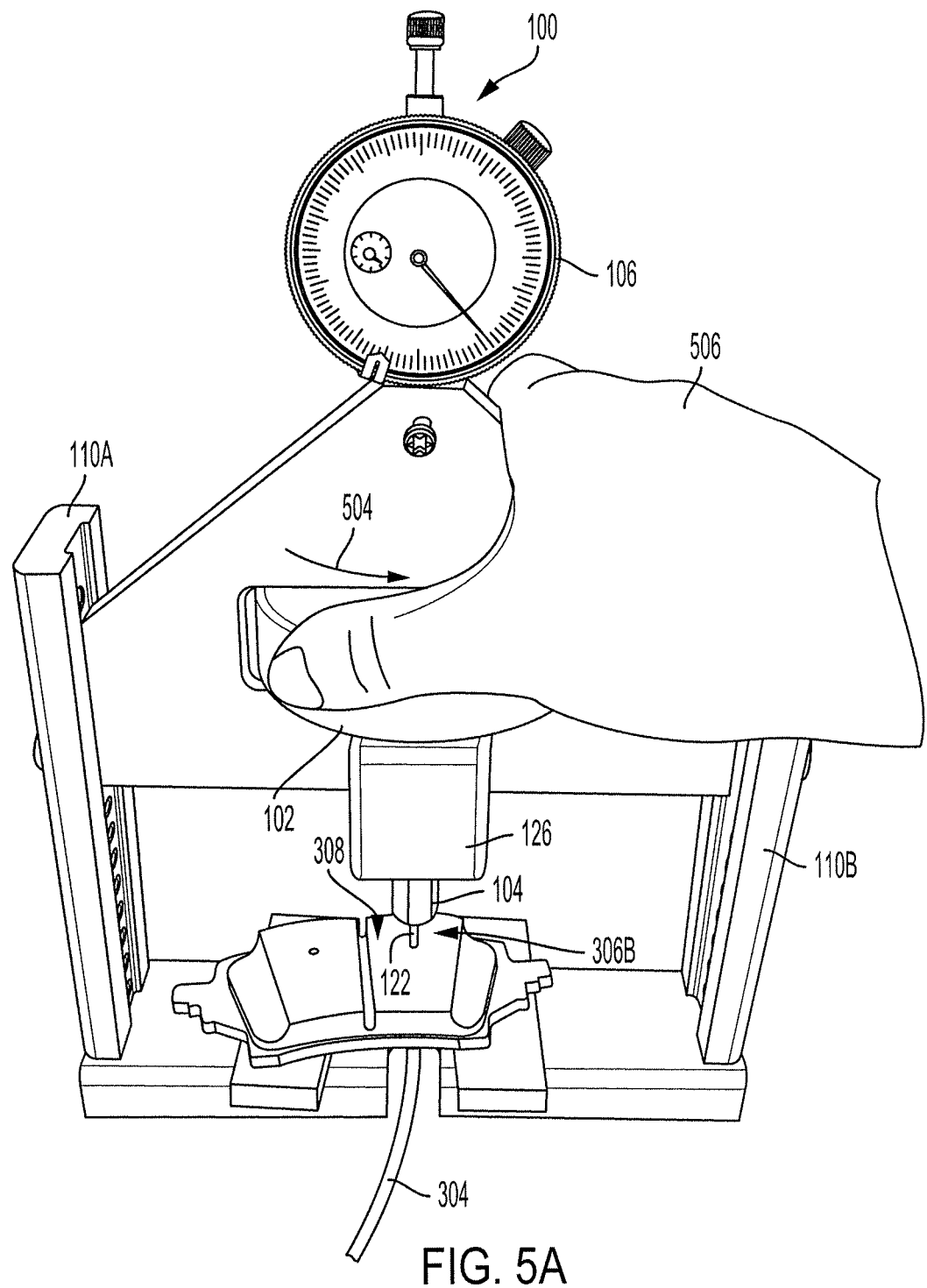
FIGS. 5A-5B illustrate use of the thermocouple precision press, according to various embodiments of the invention.

The base plate 118 may have a recess 116 (or notch) for receiving the thermocouple protruding from the brake pad, illustrated in FIGS. 4 and 5A.

Figure 2:
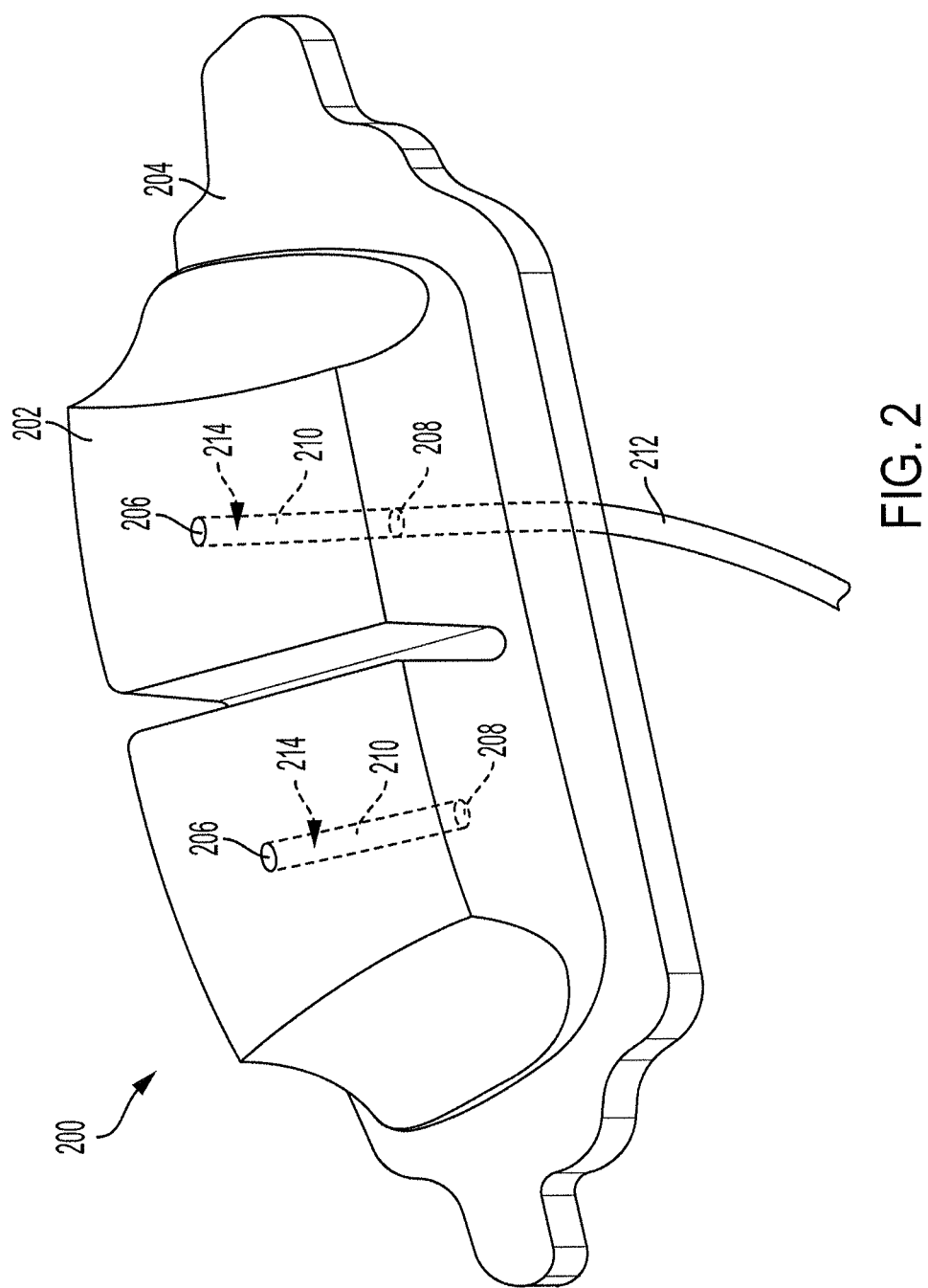
FIG. 2 illustrates a brake pad coupled to a thermocouple, according to various embodiments of the invention.

FIG. 2 illustrates a brake pad 200 connected to a thermocouple 212. The brake pad 200 includes a friction compound 202 and a backing plate 204. The friction compound 202 makes contact with a rotor to slow the rotation of the wheels of a vehicle. The thermocouple 212 may be used to test the performance of the friction compound 202 during testing of the brake pad 200.

The brake pad 200 includes a channel 210 defining a cavity 214. The channel 210 has a first opening 206 and a second opening 208. The thermocouple 212 is inserted into the second opening 208 and the thermocouple is located within the cavity 214. In many situations, the thermocouple 212 is advanced through the channel 210 until a tip 216 of the thermocouple 212 is at or near the first opening 206. The tip 216 of the thermocouple 212 is then pushed back down into the cavity 214 using the thermocouple precision press 100 illustrated in FIG. 1.

Figure 3:
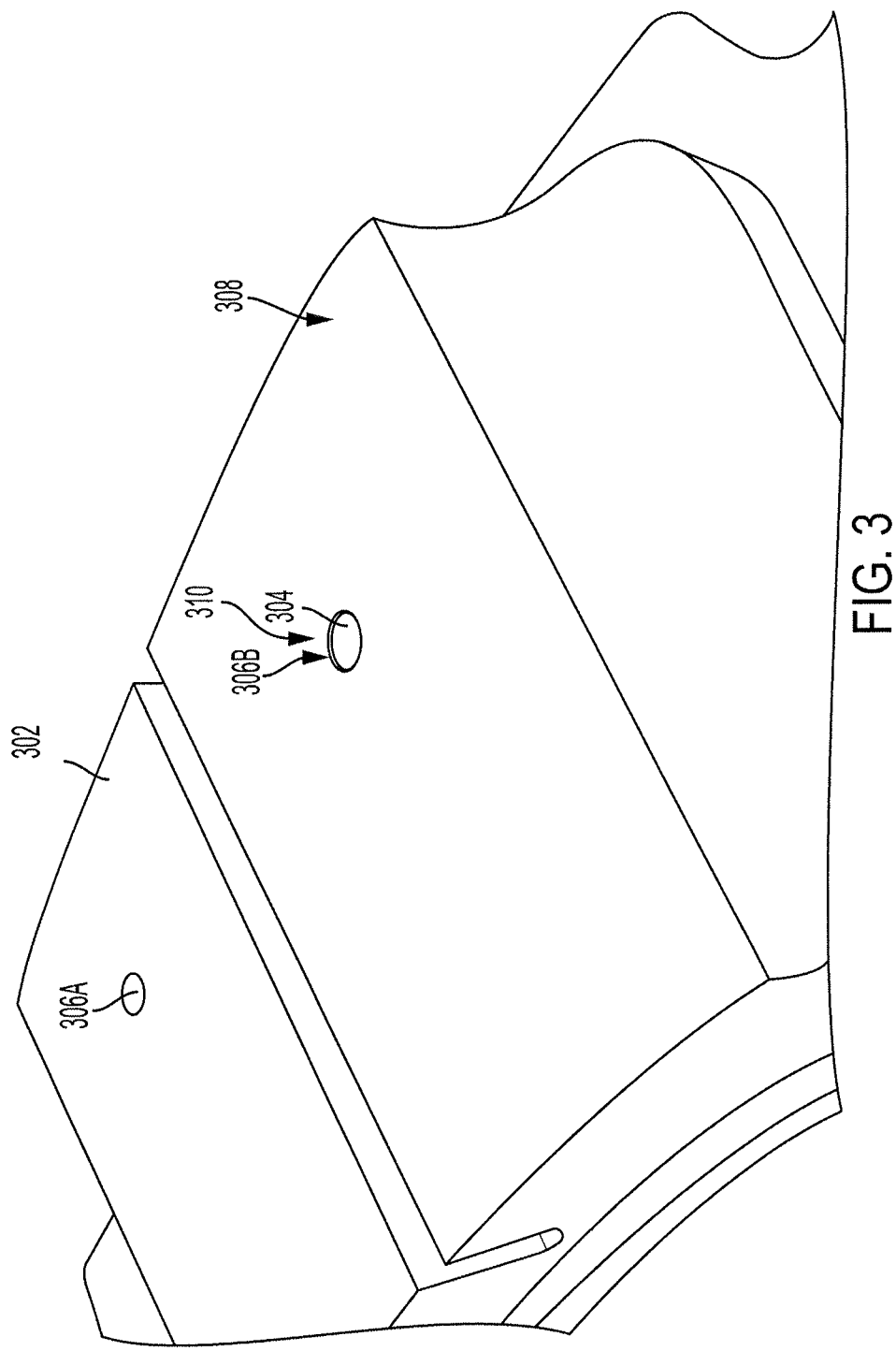
FIG. 3 illustrates a detailed view of a thermocouple coupled to a brake pad, according to various embodiments of the invention.

FIG. 3 is a detailed view of a brake pad 302 having a first channel 306A and a second channel 306B. A tip 310 of a thermocouple 304 is located within the second channel 306B. The tip 310 of the thermocouple 304 is substantially aligned with the surface 308 of the brake pad 302. If the brake pad 302 and the thermocouple 304 were used to test the brake pad 302 in the state shown in FIG. 3, the thermocouple 304 would detect temperature data associated with the rotor, and not temperature data associated with the friction compound of the brake pad 302. In addition, the thermocouple 304 may be damaged by the heat and friction the tip 310 is exposed to when the brake pad 302 makes contact with the rotor.

FIG. 4 illustrates the rod 122 and the rod base 104 of the thermocouple precision press 100 being aligned with the brake pad 302 and the thermocouple 304. The brake pad 302 has a first channel 306A and a second channel 306B, with the thermocouple 304 inserted into the second channel 306B. The tip 310 of the thermocouple 304 is substantially aligned with the surface 308 of the brake pad 302, as shown in FIG. 3. The recess 116 of the base plate 118 allows for the thermocouple 304 to not be compressed underneath the brake pad 302 as the positioning of the thermocouple 304 is being adjusted.

Figure 5B:
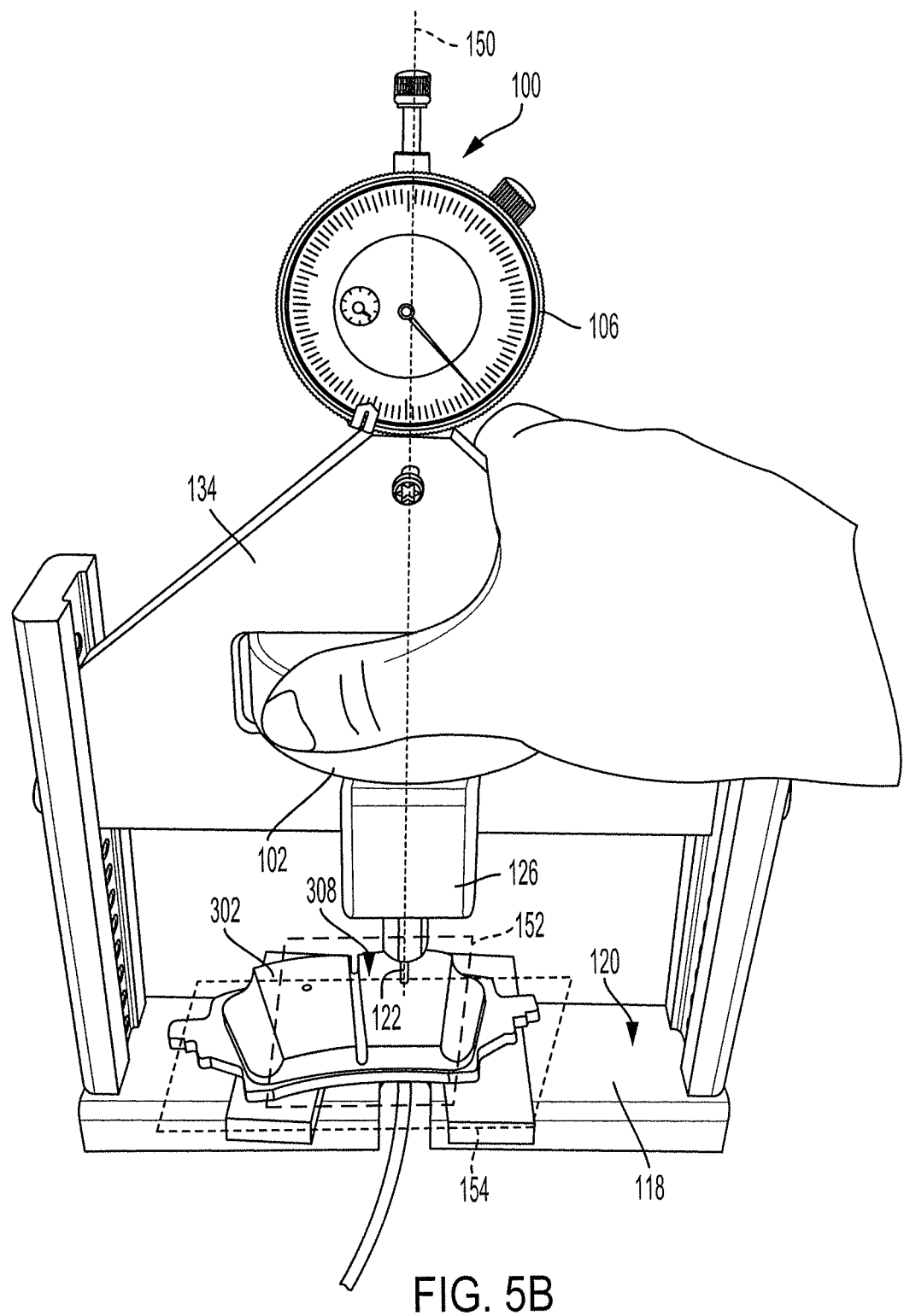

FIGS. 5A-5B illustrate the thermocouple precision press 100 being used to adjust the positioning of the thermocouple 304 within the second channel 306B of the brake pad 302. The wheel 102 is turned by a hand of the user 506 in a first direction 504 to move the block 126 downward toward the brake pad 302 until the tip of the rod 122 contacts the tip of the thermocouple 304 at the surface 308 of the brake pad 302. In some embodiments, when the tip of the rod 122 contacts the tip of the thermocouple 304 at the surface 308 of the brake pad 302, the gauge 106 may be reset to zero such that the distance the rod 122 is lowered is reflected by the gauge 106.

The wheel 102 is further turned in the first direction 504 to lower the rod 122 into the second channel 306B, thereby pushing the tip of the thermocouple 304 into the cavity of the second channel 306B and away from the surface 308 of the brake pad 302. The distance that the tip of the thermocouple 304 is recessed into the brake pad 302 may vary based on the composition of the brake pad 302 and/or what is being tested for with respect to the brake pad 302. The hand of the user 506 may press downward onto the body 134 to exert a downward force onto the thermocouple precision press 100 to stabilize the thermocouple precision press 100. The fingers of the hand of the user 506 may be able to detect a tactile feel for the movement of the thermocouple by the rod 122.

Once the tip of the thermocouple 304 is pushed into the second channel 306B to the desired depth, the wheel 102 may be turned in a second direction opposite the first direction 504 to move the rod 122 upward and away from the brake pad 302.

As shown in FIG. 5B, the shaft 128 lies along an axis 150. The rod 122 is also located along the axis 150. The axis 150 intersects with the center of the wheel 102, and the axis 150 is also the axis of rotation of the wheel 102. The rotation of the wheel 102 about the axis 150 translates to vertical movement of the rod 122 along the axis 150 as a result of threads located on the shaft 128 and the inner surface of the wheel 102 that contacts the shaft 128.

Also, as shown in FIG. 5B, the surface 308 of the brake pad 302 lies along a first plane 152. The brake pad 302 lies on the top surface 120 of the base plate 118. The top surface 120 of the base plate 118 lies along a second plane 154. The first plane 152 and the second plane 154 may be parallel. The first plane 152 and the axis 150 may be perpendicular, such that the rod 122 contacts the surface 308 of the brake pad 302 at a right angle.

Figure 6A:
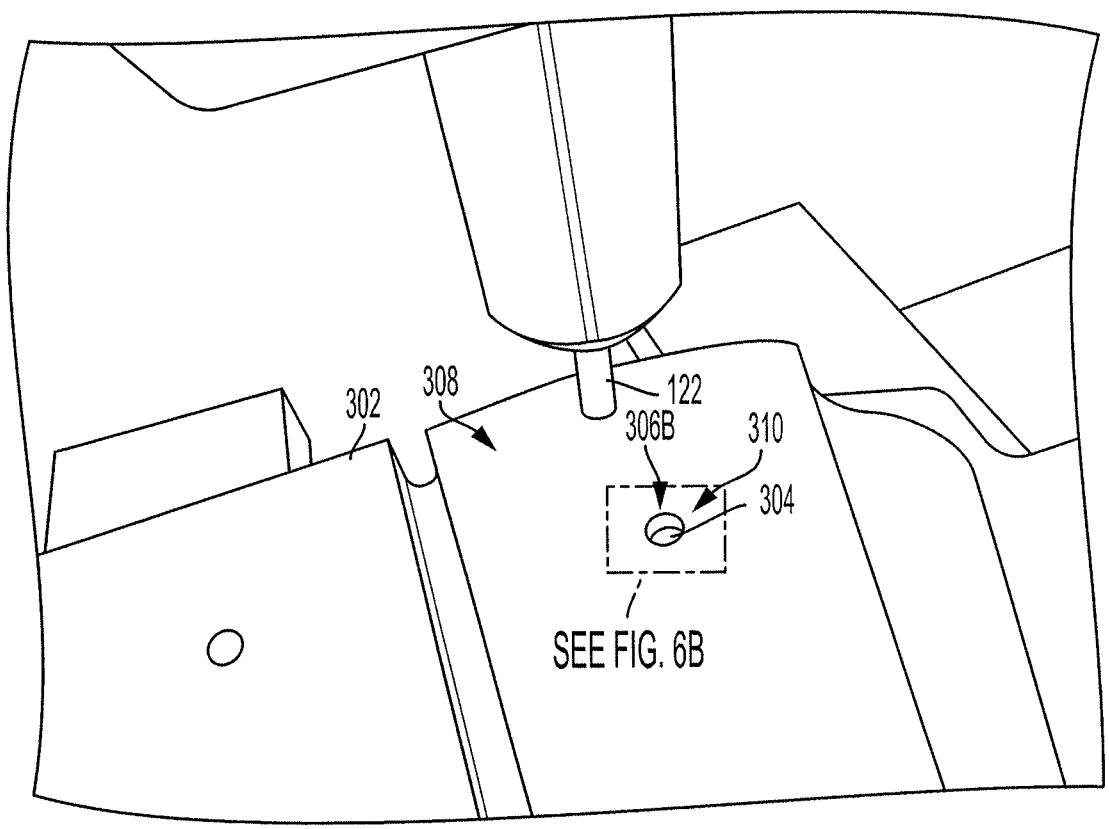
FIGS. 6A-6B illustrate detailed views of the brake pad and the thermocouple after using the thermocouple precision press, according to various embodiments of the invention.
Figure 6B:
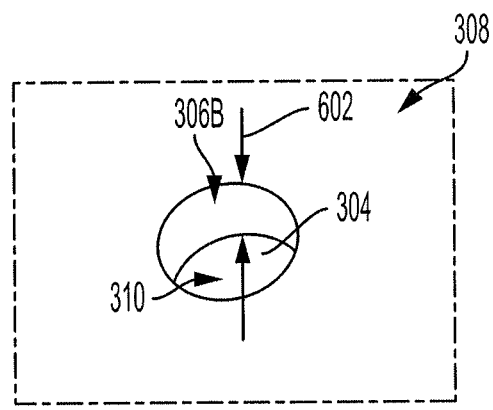

FIGS. 6A and 6B illustrate a detailed view of the brake pad 302 after using the thermocouple precision press 100. The rod 122 has been removed from the second channel 306B and the tip 310 of the thermocouple 304 has been pushed into the cavity of the second channel 306B away from the surface 308 of the brake pad 302.

The tip 310 of the thermocouple 304 has been pushed into the cavity of the second channel 306B by a distance 602, as shown in FIG. 6B. The precision of the distance 602 that may be achieved may be within a thousandth of an inch.

Figure 7:
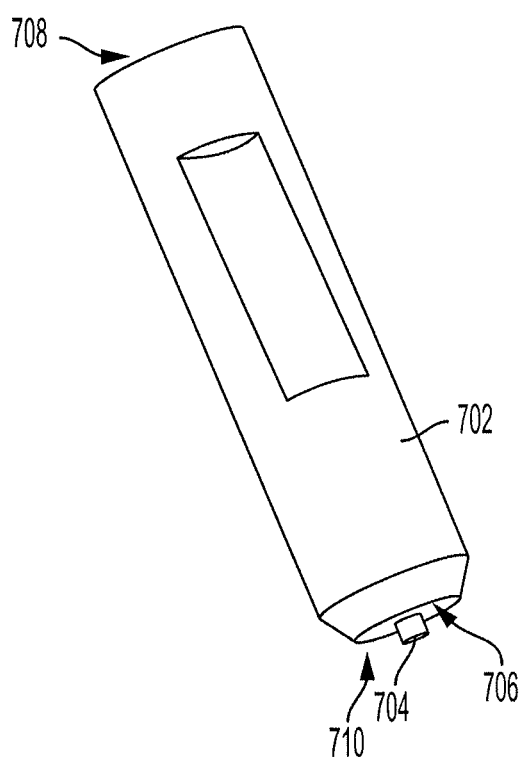
FIG. 7 illustrates an alternative method of positioning the thermocouple precision press, according to various embodiments of the invention.

FIG. 7 illustrates an alternative device that may be used to adjust the position of a thermocouple within a channel of a brake pad. Instead of using the thermocouple precision press 100 as described herein, a depth punch 702 and a hammer may be used to adjust the position of the thermocouple. The depth punch 702 has a first end 708 and a second end 710. The depth punch 702 has a protrusion 704 and a base 706. The protrusion 704 may be aligned with the tip of the thermocouple when the tip of the thermocouple is substantially aligned with the surface of the brake pad (as shown in FIG. 3). A hammer may then be used to strike the first end 708 of the depth punch 702, and the force of the hammer strike may be translated through the depth punch 702 and through the protrusion 704.

The force from the hammer strike may push the tip of the thermocouple into the cavity of the channel of the brake pad. However, the force from the hammer strike may also damage the tip of the thermocouple. The force from the hammer strike may also leave a circular imprint of the base 706 in the brake pad. A user's striking of the depth punch 702 with a hammer is not nearly as precise as the gauge 106 of the thermocouple precision press 100. In addition, the length of the protrusion 704 is set and not adjustable. Thus, multiple depth punches may be required to move thermocouples into brake pads at different depths.

For example, there may be four depth punches having varying lengths of protrusion (1.0 mm, 1.5 mm, 2.0 mm, and 2.5 mm). However, if a test were to require adjusting the position of the tip of the thermocouple to 1.7 mm from the surface of the brake pad, it may not be reliably done using the available depth punches. Having a unique depth punch for every possible depth is not as practical or cost efficient and does not work as well as using the thermocouple precision press described herein.

In addition, once the thermocouple depth has exceeded the desired depth, there may be no practical way to move the thermocouple back out toward the top surface of the brake pad, and the thermocouple may be entirely removed from the brake pad and reinserted.

In many situations, the thermocouple is used during testing of prototype friction compounds (e.g., friction compound 202), and during adjustment of the thermocouple position using the depth punch 702 and a hammer; the depth punch 702 may damage or crack the prototype friction compound when the base 706 makes contact with the friction compound. In these testing situations, there may not be more than one prototype friction compound that is fabricated, and damaging or cracking the prototype friction compound may result in testing delays as another prototype friction compound is fabricated.

FIG. 8A illustrates a front cross-sectional view of the thermocouple precision press 100 in a first position. Shown is the shaft 128 located through the gauge 106, the body 134, the wheel 102, and the block 126. The block 126 is connected to a rod base 104, which is connected to a rod 122. In some embodiments, the block 126 is connected directly to the rod 122 without a rod base 104. In other embodiments, the shaft 128 is connected directly to the rod base 104 without the block 126. In yet other embodiments, the shaft 128 is connected directly to the rod 122 without the block 126 or the rod base 104. A brake pad 802 is located below the rod 122. A thermocouple 804 is connected to the brake pad 802, and the recess 116 of the thermocouple precision press 100 provides room for the thermocouple 804 below the brake pad 802.

As shown in FIG. 8B, the gauge 106 shows a first reading 850, which in many embodiments is zero. As shown in FIG. 8C, a tip 808 of the thermocouple 804 is aligned with the top surface 806 of the brake pad 802. As described herein, it is desirable to move the tip 808 deeper into the brake pad 802.

As shown in FIG. 8D, the shaft 128 includes shaft threads 850 located on a surface of the shaft 128, and the wheel 102 includes wheel threads 852 located on an interior surface of the wheel 102 that contacts the shaft 128. The wheel threads 852 are configured to couple and engage the shaft threads 850 to translate a rotational movement of the wheel 102 into a vertical movement of the shaft 128. In some embodiments, the shaft 128 does not rotate as the wheel 102 rotates and the shaft 128 moves vertically.

Figure 9A:
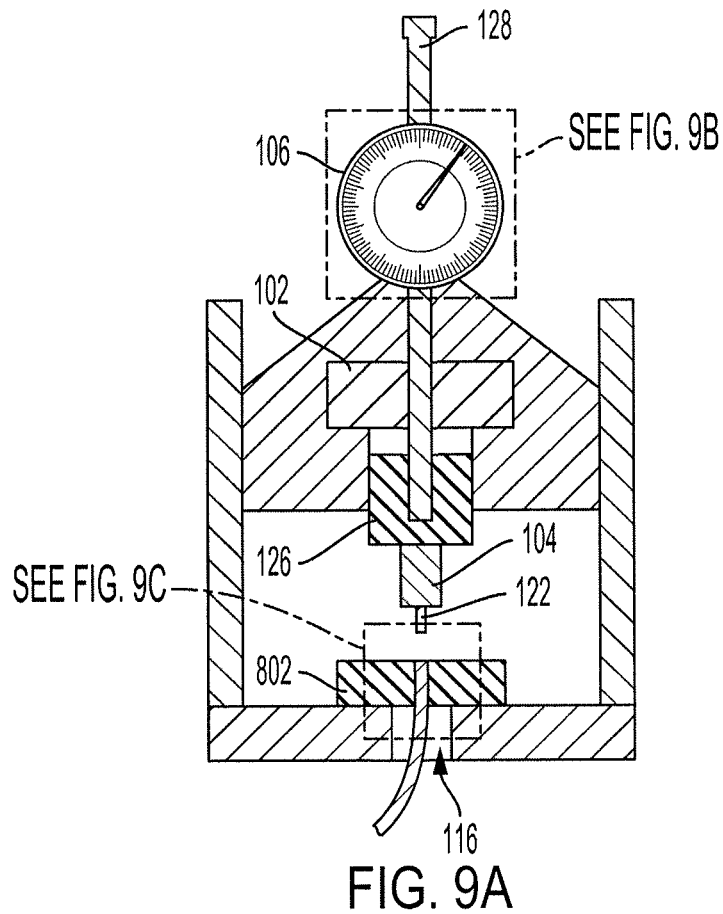
FIGS. 9A-9C illustrate a front cross-sectional view of the thermocouple precision press in a second position, according to various embodiments of the invention.

FIG. 9A illustrates a front cross-sectional view of the thermocouple precision press 100 in a second position. The wheel 102 is turned to advance the thermocouple precision press 100 from the first position shown in FIGS. 8A-8C to the second position shown in FIGS. 9A-9C. By turning the wheel 102, the shaft 128 is moved downward toward the brake pad 802. As the shaft 128 moves downward, the block 126, the rod base 104, and the rod 122 are also moved downward toward the brake pad 802.

Figure 9B:
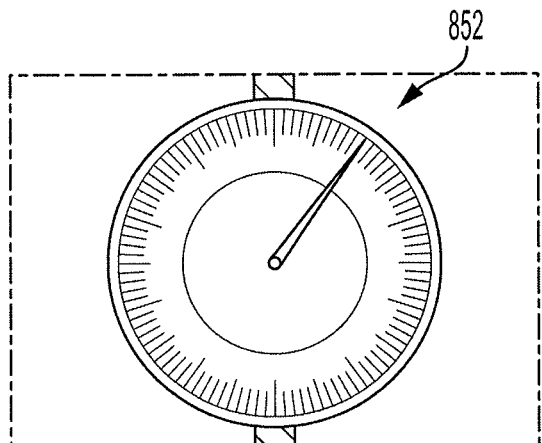
Figure 9C:
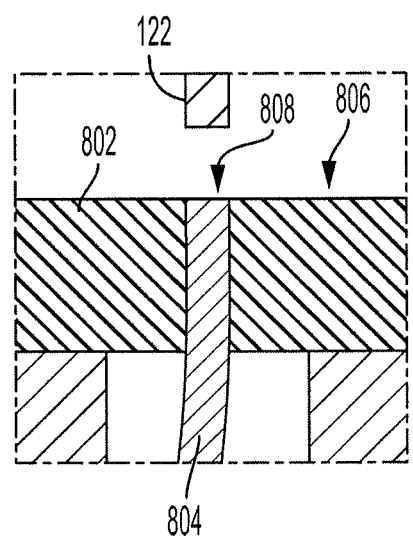

The distance moved downward by the rod 122 from the first position shown in FIG. 8A to the second position shown in FIG. 9A is reflected by the second reading 852 of the gauge 106 shown in FIG. 9B. As shown in FIG. 9C, the rod 122 is now closer to the brake pad 802 than it was in FIG. 8C.

Figure 10A:
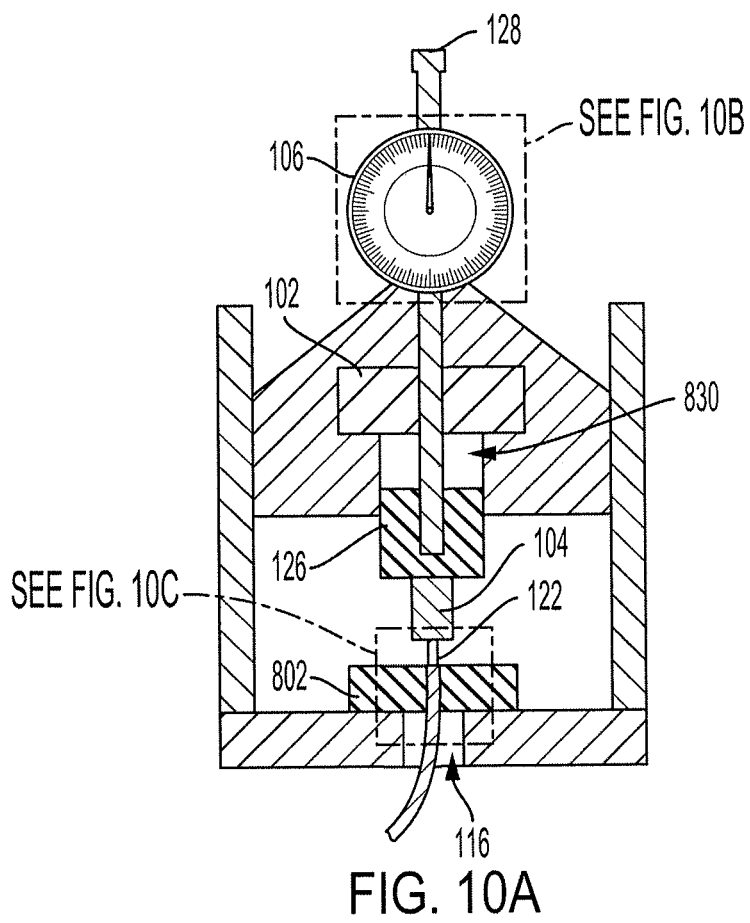
FIGS. 10A-10C illustrate a front cross-sectional view of the thermocouple precision press in a third position, according to various embodiments of the invention.

FIG. 10A illustrates a front cross-sectional view of the thermocouple precision press 100 in a third position. The wheel 102 is further turned to advance the thermocouple precision press 100 from the second position shown in FIGS. 9A-9C to the third position shown in FIGS. 10A-10C. The shaft 128, the block 126, the rod base 104, and the rod 122 are further moved downward toward the brake pad 802. There is a gap 830 where the block 126 would be housed when the block 126 is moved fully upward by turning the wheel 102.

Figure 10B:
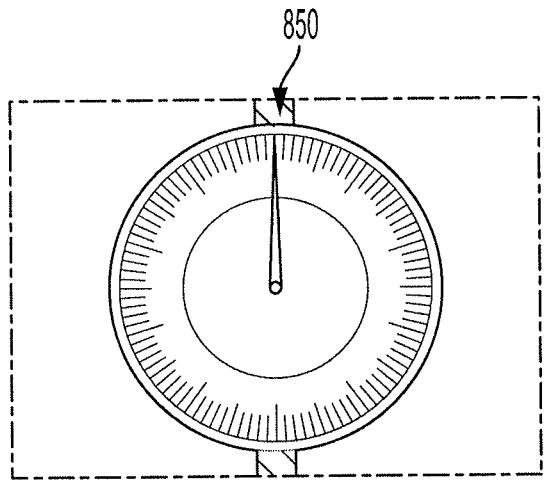
Figure 10C:
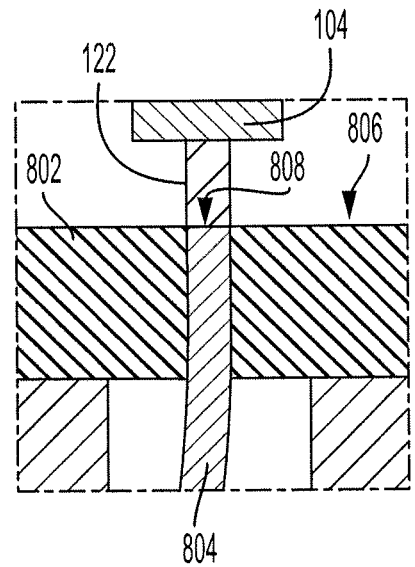

As shown in FIG. 10C, the rod 122 of the thermocouple precision press 100 is in contact with the tip 808 of the thermocouple 804. The tip 808 is aligned with the top surface 806 of the brake pad 802. That is, a plane formed by the contacting of the rod 122 and the thermocouple 804 is coplanar with the top surface 806 of the brake pad 802.

The gauge 106 may be reset so that the reading is back to the first reading 850. By returning the gauge 106 to the first reading 850, which in many embodiments is zero, the distance that the tip 808 of the thermocouple is pushed back into the brake pad 802 may be viewed in the gauge 106.

Figure 11A:
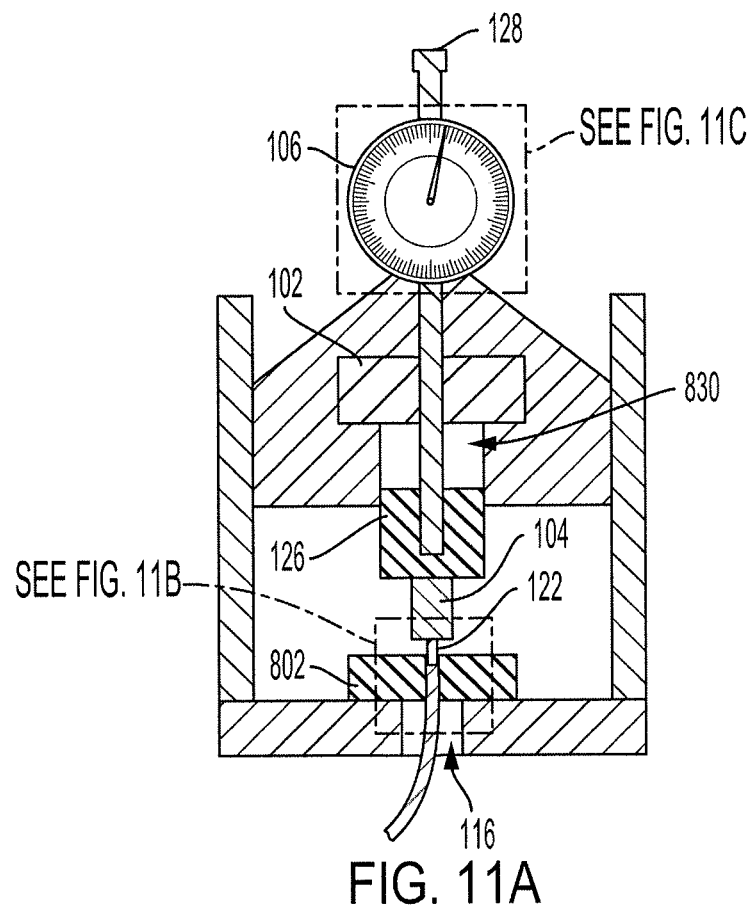
FIGS. 11A-11C illustrate a front cross-sectional view of the thermocouple precision press in a fourth position, according to various embodiments of the invention.

FIG. 11A illustrates a front cross-sectional view of the thermocouple precision press 100 in a fourth position. The wheel 102 is further turned to further advance the thermocouple precision press 100 from the third position shown in FIGS. 10A-10C to the fourth position shown in FIGS. 11A-11C. The shaft 128, the block 126, the rod base 104, and the rod 122 are further moved downward toward the brake pad 802.

Figure 11B:
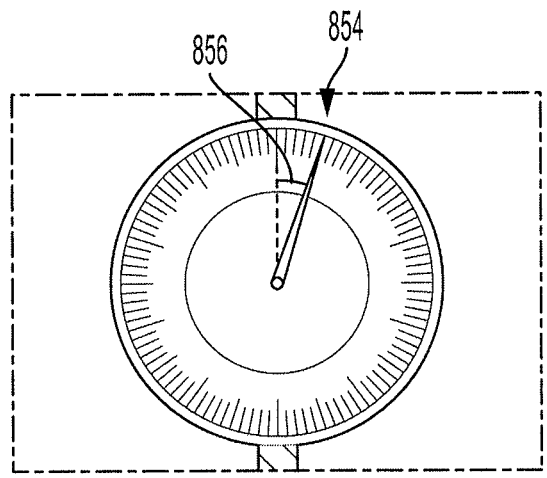
Figure 11C:
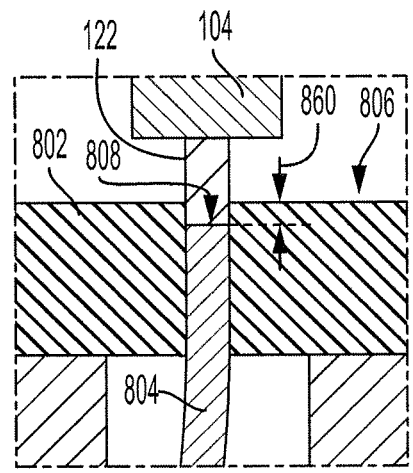

As shown in FIG. 11C, the rod 122 of the thermocouple precision press 100 is in contact with the tip 808 of the thermocouple 804 and has pushed the thermocouple 804 into the brake pad 802. The depth 860 of the recession of the tip 808 into the brake pad 802 is measured by the gauge 106, as shown in FIG. 11B. The gauge 106 of FIG. 11B shows a third reading 854, which is moved a distance 856 from the first reading 850 of zero. For example, the third reading 854 may be 1.75 mm, which corresponds to the depth 860. The operator of the thermocouple precision press 100 is now able to reliably determine that the tip 808 of the thermocouple 804 is 1.75 mm away from the top surface 806 of the brake pad 802. This level of precision, consistency, and operational efficiency is not possible with other methods of adjusting the position of the thermocouple 804 within the brake pad 802.

Figure 12:
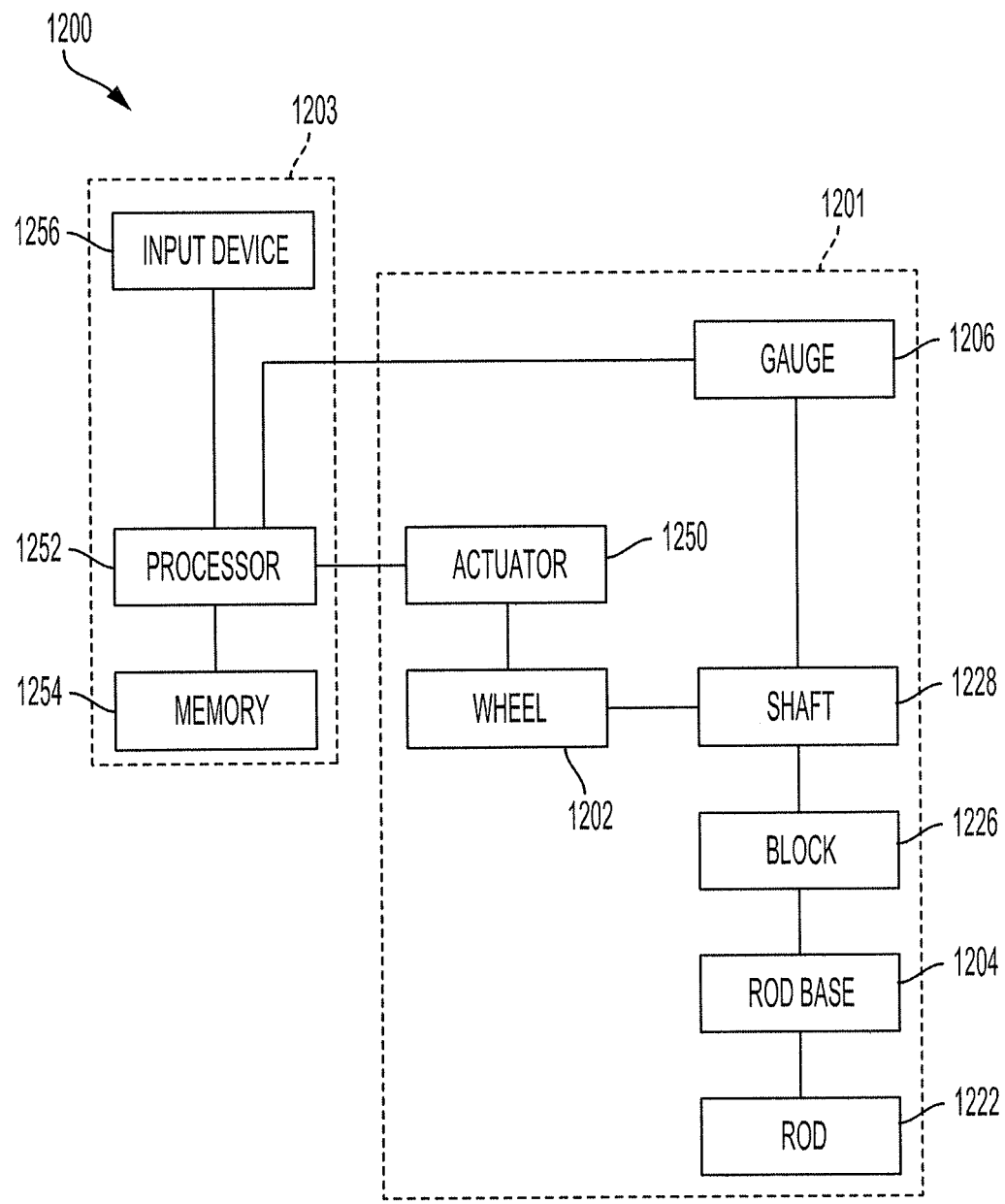
FIG. 12 illustrates an automated embodiment of the thermocouple precision press, according to various embodiments of the invention.

FIG. 12 illustrates an embodiment of the thermocouple precision press that is automated. A system 1200 includes a thermocouple precision press 1201 and a computing device 1203. In some embodiments, the thermocouple precision press 1201 and the computing device 1203 are separate devices that are communicatively connected, and in other embodiments, the thermocouple precision press 1201 and the computing device 1203 are combined into one device that may be collectively referred to as a thermocouple precision press.

The thermocouple precision press 1201 includes a wheel 1202 similar to the wheel 102 described herein, a shaft 1228 similar to the shaft 128 described herein, a gauge 1206 similar to the gauge 106 described herein, a block 1226 similar to the block 126 described herein, a rod base 1204 similar to the rod base 104 described herein, and a rod 1222 similar to the rod 122 described herein. In some embodiments, the thermocouple precision press 1201 does not include the block 1226. In some embodiments, the thermocouple precision press 1201 does not include the rod base 1204. In some embodiments, the thermocouple precision press 1201 does not include the block 1226 nor the rod base 1204.

The thermocouple precision press 1201 also includes an actuator 1250. The actuator 1250 is configured to mechanically turn the wheel 1202 and is analogous to the hand of the user 506 in FIG. 5A. The actuator 1250 may be a motor or any other device configured to impart motion in one or more directions. In some embodiments, the actuator 1250 moves the wheel 1202 in a first direction and also moves the wheel 1202 in a second direction opposite the first direction.

The actuator 1250 is connected to a processor 1252 configured to instruct the actuator to turn the wheel 1202 in the first direction, the second direction, or to cease turning of the wheel 1202. The processor 1252 may be one or more computer processors specifically configured to perform the tasks described herein. The processor 1252 is connected to a memory 1254. The memory 1254 may be a non-transitory memory storing instructions that are executed by the processor 1252.

The processor 1252 may be connected to an input device 1256 configured to receive input from a user. The input device 1256 may be a keyboard, a computer mouse, a touchscreen device, or any other device for receiving user input. The input device 1256 may be configured to receive from the user a depth to push the thermocouple into the brake pad (e.g., distance 602 or depth 860).

The processor 1252 may also be connected to the gauge 1206. The processor 1252 may receive distance data from the gauge 1206 indicating a distance travelled by the rod 1222. The distance travelled by the rod 1222 corresponds to the depth that the thermocouple is pushed into the brake pad, as input by the user. When the distance travelled by the rod meets the depth received from the user, the processor 1252 instructs the actuator 1250 to cease turning of the wheel 1202. The processor 1252 may then instruct the actuator 1250 to turn the wheel 1202 in the opposite direction, to remove the rod 1222 from the channel of the brake pad that the thermocouple is located in.

Figure 13:
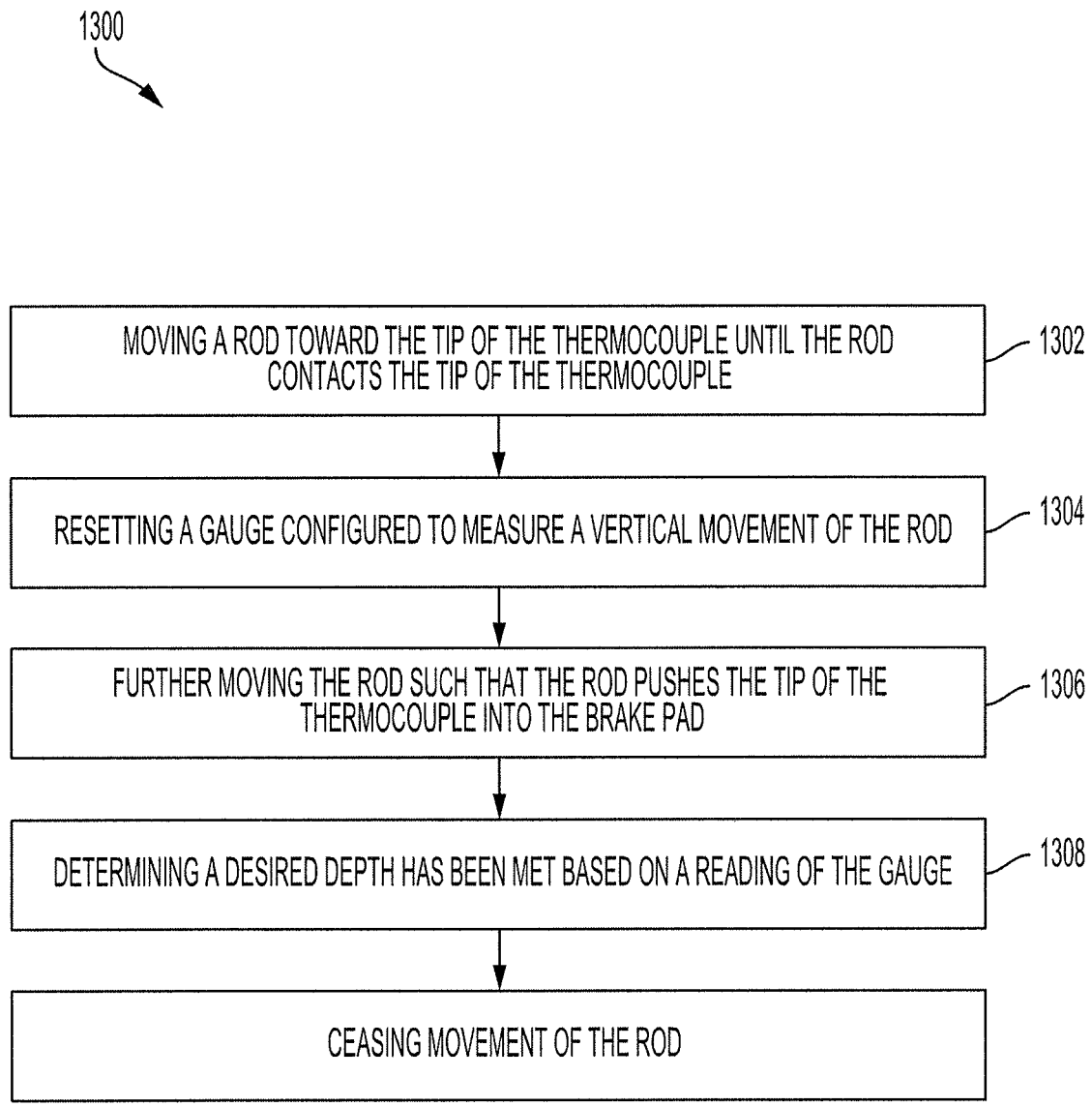
FIG. 13 illustrates a flowchart of a process for using the thermocouple precision press, according to various embodiments of the invention.

FIG. 13 illustrates a flowchart of a process 1300 for adjusting a position of a thermocouple (e.g., thermocouple 304, 212, 804) within a brake pad (e.g., brake pad 302, 200, 802), the thermocouple having a tip (e.g., tip 216, 310, 808) aligned with a top surface (e.g., surface 308, 806) of the brake pad. The thermocouple may be located in a channel (e.g., channel 210) of the brake pad.

A rod (e.g., rod 122) is moved toward the tip of the thermocouple until the rod contacts the tip of the thermocouple (step 1302). This is illustrated in FIGS. 10A and 10C. The rod may be moved by a wheel (e.g., wheel 102) being turned. The wheel may be connected to a shaft (e.g., shaft 128) that is connected to the rod, and when the wheel is turned, the rotational movement of the wheel is translated into vertical movement of the shaft, as described herein. The vertical movement of the shaft causes vertical movement of the rod, as the rod is coupled to the shaft.

A gauge (e.g., gauge 106) is reset when the rod contacts the tip of the thermocouple (step 1304). This is illustrated in FIG. 10B. The gauge is configured to measure a vertical movement of the rod. As described herein, the gauge may be connected to the shaft, and the vertical movement of the shaft may be detected by the gauge. The vertical movement of the rod may accordingly be determined based on the vertical movement of the shaft.

The rod is further moved such that the rod pushes on the tip of the thermocouple into the brake pad (step 1306). This is illustrated in FIGS. 11A-11C. The rod may be further moved by further turning the wheel.

A reading of the gauge is used to determine that a desired depth has been met (step 1308). This is illustrated in FIG. 11B. The reading of the gauge may correspond to a depth of the tip of the thermocouple into the brake pad, as the rod has displaced the thermocouple inside the channel of the brake pad.

The movement of the rod is ceased (step 1310). The movement of the rod may be ceased by ceasing turning of the wheel.

While the systems, devices, and methods herein are described with respect to adjusting the position of a thermocouple in a brake pad, the systems, devices, and methods described herein may be used with any apparatus (e.g., a thermocouple) inside of an object (e.g., a brake pad). For example, the position of a sensor within a material may be adjusted using the systems, devices, and methods described herein.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A device for adjusting a position of a thermocouple located in a channel within a brake pad, a tip of the thermocouple being aligned with a top surface of the brake pad, the device comprising:
   a wheel configured to be turned in a first direction, causing a rod to move downward to contact and push the thermocouple into the brake pad; and a gauge configured to measure and display a downward distance moved by the rod when the wheel is turned, the downward distance corresponding to a distance between the tip of the thermocouple and the top surface of the brake pad.

2. The device of claim 1, further comprising a shaft connected to the wheel and the gauge and coupled to the rod at a bottom end of the shaft,
  wherein the wheel is further configured to move the shaft downward when the wheel is turned in the first direction, causing the rod to move downward, and
  wherein the gauge measures the downward distance moved by the rod by measuring a downward distance moved by the shaft.

3. The device of claim 2, wherein the shaft is colinear to an axis of rotation of the wheel, and wherein the top surface of the brake pad is perpendicular to the shaft.

4. The device of claim 2, wherein the shaft is threaded and a surface of the wheel contacting the shaft is correspondingly threaded such that rotational movement of the wheel translates to linear, movement of the shaft.

5. The device of claim 2, further comprising a block connecting the shaft at the bottom end of the shaft to the rod.

6. The device of claim 1, wherein the wheel is further configured to be turned in a second direction, causing the rod to move upward and away from the brake pad.

7. The device of claim 1, wherein the wheel is configured to be turned by fingers of a human hand.

8. The device of claim 1, further comprising an actuator connected to the wheel and configured to turn the wheel, and a processor connected to the actuator and the gauge, the processor configured to automatically turn the wheel using the actuator until the distance between the tip of the thermocouple and the top surface of the brake pad is equal to a distance identified by a user.

9. The device of claim 1, further comprising a body connected to the wheel and a plurality of legs, an edge of the body and the plurality of legs forming an opening where the brake pad and thermocouple are received, and
  wherein the body is configured to be moved vertically along the plurality of legs to adjust a size of the opening to accommodate brake pads of varying sizes.

10. The device of claim 1, wherein the gauge is configured to be reset to zero when the rod contacts the tip of the thermocouple when the tip of the thermocouple is aligned with the top surface of the brake pad.

11. A method of adjusting a position of a thermocouple within a brake pad, the thermocouple having a tip aligned with a top surface of the brake pad, the method comprising:
  moving a rod toward the tip of the thermocouple until the rod contacts the tip of the thermocouple;
  resetting a gauge configured to measure a vertical movement of the rod;
  further moving the rod such that the rod pushes the tip of the thermocouple into the brake pad;
  determining a desired depth has been met based on a reading of the gauge; and
  ceasing movement of the rod.

12. The method of claim 11, wherein the rod is moved by turning a wheel coupled to the rod in a first direction.

13. The method of claim 12, wherein the wheel moves the rod by moving a shaft, the shaft being connected to the wheel and the gauge and coupled to the rod at a bottom end of the shaft.

14. The method of claim 13, wherein the shaft is moved by the wheel by threads of the shaft and threads of the wheel translating rotational movement of the wheel to linear movement of the shaft.

15. The method of claim 13, wherein the gauge measures the vertical movement of the rod by measuring a vertical movement of the shaft.

16. The method of claim 12, wherein the wheel is turned by fingers of a human hand.

17. The method of claim 12, further comprising:
  receiving by a processor connected to an actuator configured to turn the wheel and connected to the gauge, the desired depth;
  instructing, by the processor, the actuator to turn the wheel to move the rod to push the tip of the thermocouple into the brake pad; and
  automatically determining, by the processor, that the desired depth has been met.

18. The method of claim 12, further comprising moving the rod away from the brake pad by turning the wheel in a second direction.

* * * * *